(12) United States Patent
Zhu

(10) Patent No.: US 9,068,122 B2
(45) Date of Patent: Jun. 30, 2015

(54) MULTI-PIPE EXTERNAL-HEATING COAL DECOMPOSITION EQUIPMENT

(76) Inventor: Shucheng Zhu, Nanyang (CN)

( * ) Notice: Subject to any disclaimer, the term of this patent is extended or adjusted under 35 U.S.C. 154(b) by 110 days.

(21) Appl. No.: 13/578,629

(22) PCT Filed: Nov. 23, 2010

(86) PCT No.: PCT/CN2010/078982
§ 371 (c)(1),
(2), (4) Date: Aug. 13, 2012

(87) PCT Pub. No.: WO2012/055123
PCT Pub. Date: May 3, 2012

(65) Prior Publication Data
US 2012/0308950 A1    Dec. 6, 2012

(30) Foreign Application Priority Data
Oct. 26, 2010   (CN) .......................... 2010 1 0527824

(51) Int. Cl.
*F27B 5/16*    (2006.01)
*F27B 9/14*    (2006.01)
*F27B 7/22*    (2006.01)
*C10B 53/04*   (2006.01)
*C10B 57/00*   (2006.01)
*C10B 47/00*   (2006.01)
*C10B 37/00*   (2006.01)
*C10B 47/32*   (2006.01)
*F27B 17/00*   (2006.01)
*F27D 99/00*   (2010.01)

(52) U.S. Cl.
CPC ................. *C10B 53/04* (2013.01); *C10B 47/32* (2013.01); *F27B 17/00* (2013.01); *F27D 99/0001* (2013.01)

(58) Field of Classification Search
None
See application file for complete search history.

(56) References Cited

U.S. PATENT DOCUMENTS

| | | | | |
|---|---|---|---|---|
| 1,967,762 A * | 7/1934 | Wisner | ......................... | 202/218 |
| 1,993,199 A * | 3/1935 | Wisner | ......................... | 202/150 |
| 2,151,849 A * | 3/1939 | Hardy et al. | ................... | 202/131 |
| 2,218,873 A * | 10/1940 | Cheesman et al. | .............. | 432/84 |
| 2,436,487 A * | 2/1948 | Sherban | ......................... | 241/48 |
| 2,559,557 A * | 7/1951 | Bailey et al. | .................... | 406/53 |
| 3,178,235 A * | 4/1965 | Zimmermann | ................ | 406/63 |
| 3,231,014 A * | 1/1966 | Koenig | ......................... | 165/133 |
| 3,387,380 A * | 6/1968 | Pritts, Jr. | ........................ | 34/551 |
| 3,456,933 A * | 7/1969 | Brouk | ............................ | 432/13 |
| 3,461,037 A * | 8/1969 | Knappstein et al. | .......... | 202/131 |
| 3,521,866 A * | 7/1970 | Knappstein et al. | .......... | 165/179 |

(Continued)

OTHER PUBLICATIONS

International Search Report of PCT/CN2010/078982.

*Primary Examiner* — Gregory Huson
*Assistant Examiner* — Eric Gorman

(57) ABSTRACT

A multi-pipe external-heating coal decomposition equipment, comprising a airtight kiln body; a channel for impelling and decomposing coal is formed in the kiln body, which has a coal inlet, a coal outlet and a collecting pipe for coal decomposition gas; a heat transfer chamber is formed between the channel and inner wall of the kiln body, which is connected with a high temperature gas heating facility and comprises a heated gas outlet. Because the channel for impelling and decomposing coal is set in a kiln body with high temperature, so a vast of heat gas in high temperature kiln body surrounds the channel and its heat conducts and radiates to the pulverized coal in the channel. Thus, the pulverized coal can fully absorb the heat to be heated for decomposing to the gas, coal tar and coal with high heat-value in the channel.

10 Claims, 2 Drawing Sheets

(56) References Cited

U.S. PATENT DOCUMENTS

| | | | |
|---|---|---|---|
| 4,321,034 A * | 3/1982 | Taccone | 432/105 |
| 4,348,057 A * | 9/1982 | Parenti et al. | 299/12 |
| 4,348,170 A * | 9/1982 | Vatsky et al. | 431/188 |
| 4,373,900 A * | 2/1983 | Eckelmann | 431/182 |
| 4,377,978 A * | 3/1983 | Eusner | 110/262 |
| 4,392,353 A * | 7/1983 | Shibuya et al. | 60/657 |
| 4,392,823 A * | 7/1983 | Weber et al. | 432/114 |
| 4,422,846 A * | 12/1983 | Weber et al. | 432/18 |
| 4,474,010 A * | 10/1984 | Shibuya et al. | 60/648 |
| 4,493,271 A * | 1/1985 | Ohayon et al. | 110/262 |
| 4,591,362 A * | 5/1986 | Yudovich et al. | 48/197 R |
| 4,902,221 A * | 2/1990 | Collins et al. | 431/183 |
| 4,924,784 A * | 5/1990 | Lennon et al. | 110/261 |
| 5,011,400 A * | 4/1991 | Vatsky | 431/4 |
| 5,037,450 A * | 8/1991 | Keener et al. | 44/622 |
| 5,207,972 A * | 5/1993 | Hemsath | 266/44 |
| 5,297,959 A * | 3/1994 | Hemsath | 432/138 |
| 5,299,512 A * | 4/1994 | Olsen | 110/261 |
| 5,347,937 A * | 9/1994 | Vatsky | 110/261 |
| 5,408,943 A * | 4/1995 | Vatsky | 110/261 |
| 5,429,059 A * | 7/1995 | Wagoner et al. | 110/234 |
| 5,829,367 A * | 11/1998 | Ohta et al. | 110/261 |
| 5,842,426 A * | 12/1998 | Ohta et al. | 110/261 |
| 5,906,483 A * | 5/1999 | Zhou | 432/112 |
| 6,024,030 A * | 2/2000 | Okamoto et al. | 110/261 |
| 6,053,118 A * | 4/2000 | Okamoto et al. | 110/261 |
| 6,116,171 A * | 9/2000 | Oota et al. | 110/263 |
| 6,210,154 B1 * | 4/2001 | Evans et al. | 432/106 |
| 6,347,937 B1 * | 2/2002 | Yearham et al. | 432/114 |
| 2002/0069757 A1 * | 6/2002 | Lehn | 95/271 |
| 2003/0034278 A1 * | 2/2003 | Laux | 209/143 |
| 2004/0231572 A1 * | 11/2004 | Ohtani et al. | 110/261 |
| 2006/0169181 A1 * | 8/2006 | Youn et al. | 106/740 |
| 2011/0041393 A1 * | 2/2011 | Sugita et al. | 44/626 |
| 2012/0304537 A1 * | 12/2012 | Zhu | 44/620 |
| 2012/0308951 A1 * | 12/2012 | Zhu et al. | 432/200 |
| 2013/0126330 A1 * | 5/2013 | Zhu et al. | 202/208 |
| 2013/0134031 A1 * | 5/2013 | Zhu et al. | 202/99 |
| 2013/0167441 A1 * | 7/2013 | Sevastyanov | 48/210 |
| 2013/0240343 A1 * | 9/2013 | Wolfe | 201/5 |
| 2013/0319646 A1 * | 12/2013 | Einav et al. | 165/185 |

* cited by examiner

MULTI-PIPE EXTERNAL-HEATING COAL DECOMPOSITION EQUIPMENT

FIELD OF THE INVENTION

The invention relates to comprehensive utilization of coal substance for saving energy and emission reduction, particularly relates to a multi-pipe external-heating coal decomposition equipment.

BACKGROUND OF THE INVENTION

In conventional technology, coal is used to produce coal gas, natural gas, or used to produce gas by coking at high temperature, medium temperature or low temperature. However, the above-mentioned technology is required to block pulverized coal or sift lump coal, as a result, it increases the cost of raw material, or cause the produced gas without a high heat value, a big additional value, and a significant economy and social benefits. The heating methods of furnace can be classified as external-heating style, internal heating style and hybrid-heating style. Specifically, the heating medium in external-heating furnace is not contact directly with raw materials and heat is conducted from furnace wall. The heating medium in the internal-heating furnace contacts with the raw materials directly, and the heating methods are classified as solid heat carrier style and gas heat carrier style according to different heat mediums.

At present, there are two kinds of conventional coal decomposition equipments, one of which has an up-draft kiln structure. The up-draft kiln structure is used for combusting flue gas and combustible gases produced by coal, which has low gas purity and a low additional value, as well as partially discharge of gas. This results in a significant resources wasting and environmental pollution. Another kind of coal decomposition equipment has a shaft kiln structure. Under the structure, coal lumps are placed on clapboard with holes, and a heater is provided above the coal lumps. Because the coal lumps on the clapboard are accumulated to a certain thickness, they cannot be uniformly heated and decomposed, and are required to be cyclically heated and decomposed by the decomposed gas. More importantly, since the large amount of holes for ventilation and circulatory function provided on the clapboard, pulverized coal can leak from the holes. To avoid the condition, it is necessary to process the pulverized coal into coal briquette when introducing it into the shaft kiln. Thus, it will increase the cost of pulverized coal decomposition, and reduce the economic benefits because the pulverized coal cannot be directly used for coal decomposition.

There is a conventional coal decomposition equipment, which includes an airtight kiln body with an inlet and an outlet. The airtight kiln body has a flame gas pipeline heating means. A channel for impelling and decomposition coal is formed between the flame gas pipeline heating means and the inner wall of the kiln body. A collecting pipe for coal decomposition gas is provided on the kiln body to communicate with the channel for impelling and decomposing coal. Although the coal can be decomposed and separated to a good purity, however, the rotary kiln body limits the products' yields. In addition, it is no ideally enough about the effect of heating the pulverized coal outside the channel through the internal heating channel, and it cannot satisfy the production requirements of the fast decomposition and separation of coal.

SUMMARY OF THE INVENTION

To solve the above problems in prior arts, an object of the present invention is to provide a multi-pipe external-heating coal decomposition equipment, which can separate pulverized coal substance faster and thus improving their overall utilization value and saving energy, and so as to enhance its economic and social benefits.

A multi-pipe external-heating coal decomposition equipment, comprises an airtight kiln body; wherein a channel for impelling and decomposing coal is formed in the kiln body, which has a coal inlet, a coal outlet and a collecting pipe for coal decomposition gas; the channel is connected with a support rotating facility formed outside of the kiln body; a heat transfer chamber is formed between the channel and inner wall of the kiln body, which is connected with a high temperature gas heating facility and comprises a heated gas outlet.

The high temperature gas heating facility comprises a fuel supply pipe, an air supply pipe and a combustor chamber.

The high temperature gas heating facility is an electric heating facility.

The high temperature gas heating facility is provided outside of the kiln body.

The channel for impelling and decomposing coal is composed by multiple parallel close-packed pipes, one end of which has a feed cabinet to communicate with the coal inlet, and the other end of which has an output cabinet to communicate with the coal outlet.

The heated gas outlet preheats material through pipes.

In the present invention, the channel for impelling and decomposing coal is set in a kiln body with high temperature, so a vast of heat gas in high temperature kiln body surrounds the channel and its heat conducts and radiates to the pulverized coal in the channel. Thus, the pulverized coal can fully absorb the heat to be heated for decomposing to the gas, coal tar and coal with high heat-value in the channel. In addition, the feeding amount and discharge rate of the coal decomposition equipment of the present invention can be improved because the limitations of the diameter of the kiln body and rotation difficulty are removed due to the kiln body of the present invention is not required to rotate and the coal can be impelled in the channel through rotation of the channel in low speed. Also, the structure of heating at the bottom and heat dissipation at the top makes the heat produce and conduct more coincidence with the combustion rule of the fuel, and the heating effect will be better. The produced flame gas preheats the material through the heating outlet and channel, improve the use ration of the heat and reduce the heat loss. The coal decomposition equipment disclosed by the present invention makes the decomposition and separation of the pulverized coal more fast and efficient so as to save and fully utilize energy and greatly increase the utilization rate and level of coal resources, thus it will produce a significant economic and social benefits for the entire society.

BRIEF DESCRIPTION OF THE DRAWINGS

The accompanying drawings facilitate an understanding of the various embodiments of this invention. In such drawings.

DETAILED DESCRIPTION OF THE INVENTION

Embodiment 1

Figure 1:
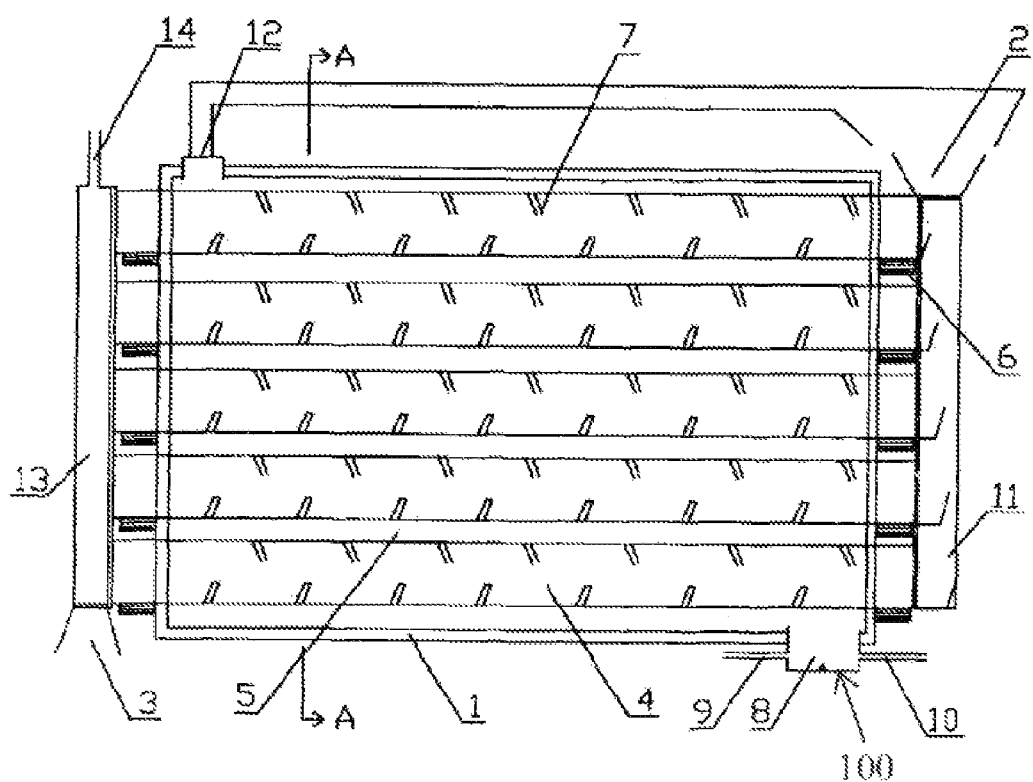
FIG. 1 is a schematic diagram of a coal decomposition equipment to show its structure according to the present invention.
Figure 2:
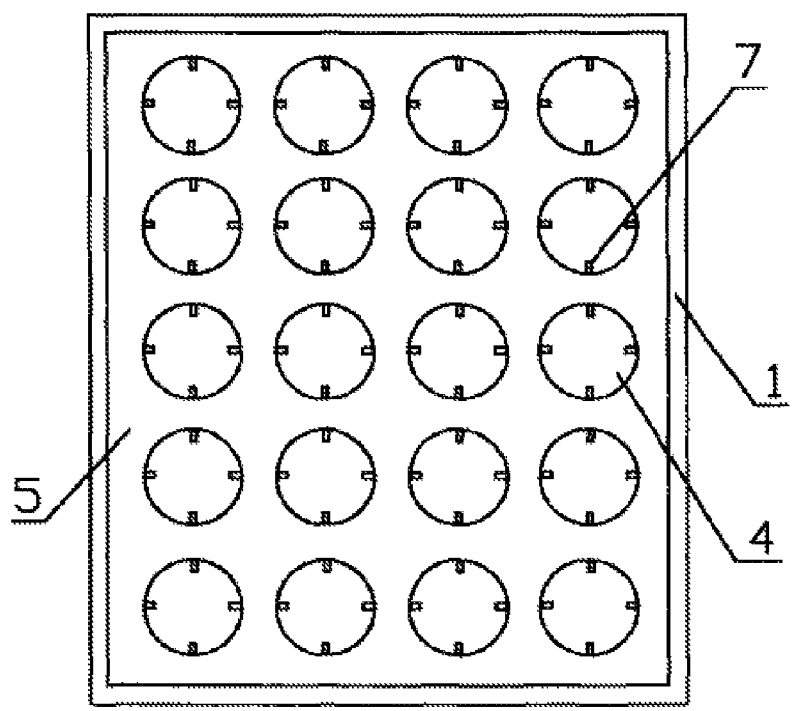
FIG. 2 is a cross-sectional view of FIG. 1 taken along line A-A.

Referring to FIG. 1 and FIG. 2, a multi-pipe external-heating coal decomposition equipment according to the present invention comprises an airtight kiln body 1. A channel 4 for impelling and decomposing coal is formed in the kiln body 1. The channel 4 has a coal inlet 2, a coal outlet 3 and a collecting pipe 14 for coal decomposition gas, which is connected with a support rotating facility 6 formed outside of the kiln body 1. An impelling board 7 is provided in the channel 4. The support rotating facility 6 is mechanically connected with both ends of the channel 4 extending outside of the kiln body 1. The mechanical connection can be a gear connection or a chain connection, which is used for driving the rotation of the channel 4. A heat transfer chamber 5 is formed between the channel 4 and the inner wall of the kiln body 1, which is connected with a high temperature gas heating facility 100. A heated gas outlet 12 is provided at a side of heat transfer chamber 5 far from the high temperature gas heating facility 100. The high temperature gas heating facility 100 is set outside of the kiln body 1, which includes a fuel supply pipe 9, an air supply pipe 10 and a combustor chamber 8. The channel 4 is composed by multiple parallel close-packed pipes, one end of which has a feed cabinet 11 to communicate with the coal inlet 2, the other end of which has an output cabinet 13 to communicate with the coal outlet 3. The heated gas outlet 12 is used to preheat material through the pipes. During the working process, the support rotating facility 6 outside of the kiln body 1 rotates to drive the channel 4 to rotate, and the impelling board 7 in the channel 4 drives to push the coal forth. The mixed gas provided by the fuel supply pipe 9 and air supply pipe 10 is combusted in the combustor chamber 8 to become high temperature flame gas. Then, in the heat transfer chamber 5, the flame gas transfers and radiates its heat to the coal in the channel 4 so as to decompose the coal to turn into coal decomposition gas and high-quality coal. The coal decomposition gas is transferred for further downstream processing through the collecting pipe 14, and the high-quality coal is collected by the coal outlet 3. In the present invention, a conduction board can be provided outside of the channel 4 for improving its thermal conductivity.

Embodiment 2

A multi-pipe external-heating coal decomposition equipment according to the present invention comprises an airtight kiln body 1. A channel 4 for impelling and decomposing coal is formed in the kiln body 1. The channel 4 has a coal inlet 2, a coal outlet 3 and a collecting pipe 14 for coal decomposition gas, which is connected with a support rotating facility 6 formed outside of the kiln body 1. An impelling board 7 is provided in the channel 4. The support rotating facility 6 is mechanically connected with both ends of the channel 4 extending outside of the kiln body 1. The mechanical connection can be a gear connection. A heat transfer chamber 5 is formed between the channel 4 and the inner wall of the kiln body 1, which is connected with a high temperature gas heating facility 100. A heated gas outlet 12 is provided at a side of heat transfer chamber 5 far from the high temperature gas heating facility 100. The high temperature gas heating facility 100 is set outside of the kiln body 1, which is formed as electric heating air pipe and communicates with the heat transfer chamber 5. The channel 4 is composed by multiple parallel close-packed pipes, one end of which has a feed cabinet 11 to communicate with the coal inlet 2, the other end of which has an output cabinet 13 to communicate with the coal outlet 3. The heated gas outlet 12 is used to preheat material through the pipes. During the working process, the support rotating facility 6 outside of the kiln body 1 rotates to drive the channel 4 to rotate, and the impelling board 7 in the channel 4 drives to push the coal forth. The mixed gas provided by the fuel supply pipe 9 and air supply pipe 10 is combusted in the combustor chamber 8 to become high temperature flame gas. Then, in the heat transfer chamber 5, the flame gas transfers and radiates its heat to the coal in the channel 4 so as to decompose the coal to turn into coal decomposition gas and high-quality coal. The coal decomposition gas is transferred for further downstream processing through the collecting pipe 14.

What is claimed is:

1. A multi-pipe external-heating coal decomposition equipment, comprises an airtight stationary kiln body; wherein a channel assembly for impelling and decomposing coal is formed in the stationary kiln body, which has a coal inlet, a coal outlet, a collecting pipe for coal decomposition gas, and an impelling board arranged in the channel assembly for pushing the coal forth; the channel assembly is connected with a support rotating facility formed outside of the stationary kiln body for rotating the channel assembly; a heat transfer chamber is formed between the channel assembly and an inner wall of the stationary kiln body, which is connected with a high temperature gas heating facility and comprises a heated gas outlet; the channel assembly is composed by multiple parallel close-packed pipes, the rotation of each of the pipes is controlled by the support rotating facility, one end of each of the pipes has a feed cabinet to communicate with the coal inlet, and the other end of each of the pipes has an output cabinet to communicate with the coal outlet.

2. The coal decomposition equipment according to claim 1, wherein the high temperature gas heating facility comprises a fuel supply pipe, an air supply pipe and a combustor chamber.

3. The coal decomposition equipment according to claim 1, wherein the high temperature gas heating facility is an electric heating facility.

4. The coal decomposition equipment according to claim 1, wherein the high temperature gas heating facility is provided outside of the stationary kiln body.

5. The coal decomposition equipment according to claim 1, wherein the heated gas outlet preheats material entering kiln through pipes.

6. The coal decomposition equipment according to claim 4, wherein the heated gas outlet preheats material entering kiln through pipes.)

7. The coal decomposition equipment according to claim 2, wherein the high temperature gas heating facility is provided outside of the stationary kiln body.)

8. The coal decomposition equipment according to claim 3, wherein the high temperature gas heating facility is provided outside of the stationary kiln body.

9. The coal decomposition equipment according to claim 2, wherein the heated gas outlet preheats material entering kiln through pipes.

10. The coal decomposition equipment according to claim 3, wherein the heated gas outlet preheats material entering kiln through pipes.

* * * * *